United States Patent
Wallash

(10) Patent No.: US 7,187,512 B1
(45) Date of Patent: Mar. 6, 2007

(54) METHOD AND SYSTEM FOR ACTIVELY CONTROLLING AND REDUCING INDUCED ELECTROSTATIC VOLTAGE ON A MAGNETIC STORAGE DISK

(75) Inventor: Albert J. Wallash, Morgan Hill, CA (US)

(73) Assignee: Maxtor Corporation, Scotts Valley, CA (US)

( * ) Notice: Subject to any disclaimer, the term of this patent is extended or adjusted under 35 U.S.C. 154(b) by 40 days.

(21) Appl. No.: 11/004,133

(22) Filed: Dec. 3, 2004

Related U.S. Application Data

(60) Provisional application No. 60/526,939, filed on Dec. 4, 2003.

(51) Int. Cl.
*G11B 5/02* (2006.01)

(52) U.S. Cl. .......................................... 360/55; 360/75
(58) Field of Classification Search .................. 360/55, 360/75, 78.04, 69, 323, 234.7, 294.5; 365/173
See application file for complete search history.

(56) References Cited

U.S. PATENT DOCUMENTS

| | | | |
|---|---|---|---|
| 5,392,172 A | 2/1995 | Yoshinaga et al. ............ 360/67 |
| 5,748,412 A * | 5/1998 | Murdock et al. ............ 360/323 |
| 6,249,402 B1 * | 6/2001 | Katayama ................ 360/234.7 |
| 6,359,746 B1 * | 3/2002 | Kakekado et al. ............ 360/75 |
| 6,381,171 B1 * | 4/2002 | Inomata et al. ............. 365/173 |
| 6,700,724 B2 * | 3/2004 | Riddering et al. ............ 360/69 |
| 6,757,140 B1 * | 6/2004 | Hawwa .................... 360/294.5 |
| 6,943,980 B2 * | 9/2005 | Bonin et al. ............. 360/78.04 |
| 6,967,805 B1 * | 11/2005 | Hanchi et al. ................. 360/75 |
| 2003/0043497 A1 * | 3/2003 | Riddering et al. ............ 360/75 |

* cited by examiner

*Primary Examiner*—Fred F. Tzeng

(57) ABSTRACT

Actively controlling ESI voltage on an object such as a magnetic storage disk (12), a rotating MR head, or insulator, includes the method and system for actively monitoring (92) a generated ESI voltage on the object (12). The method and system generate (100, 102, and 104) a signal responsive to the generated ESI voltage. Then, an opposing ESI voltage is produced (76) from the responsive signal. The method and system then apply the opposing ESI voltage (76) to the object (12) for opposing and controlling the generated ESI voltage.

30 Claims, 5 Drawing Sheets
(4 of 5 Drawing Sheet(s) Filed in Color)

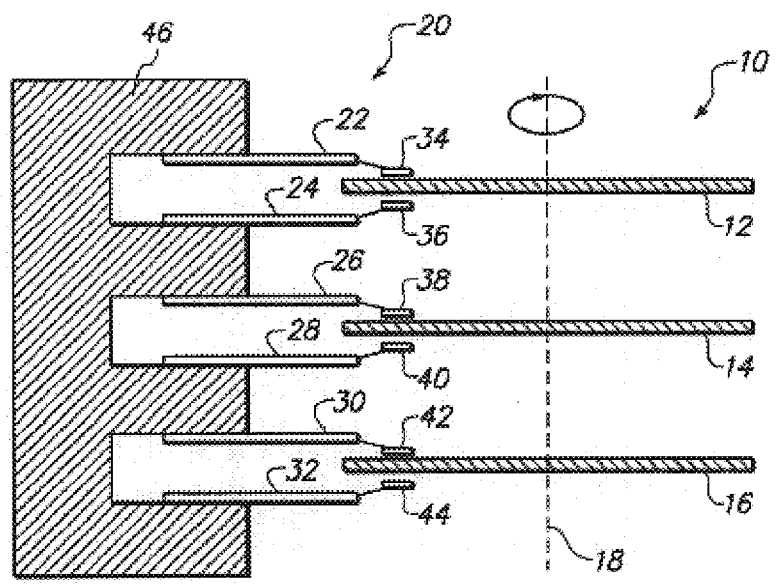
FIG. 1
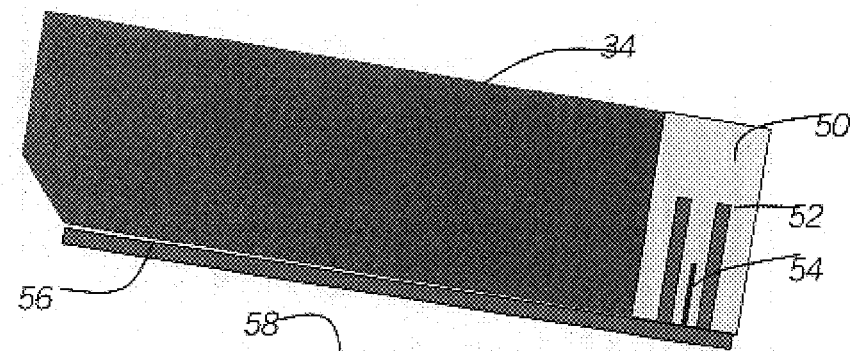
FIG. 2
FIG. 3A   FIG. 3B
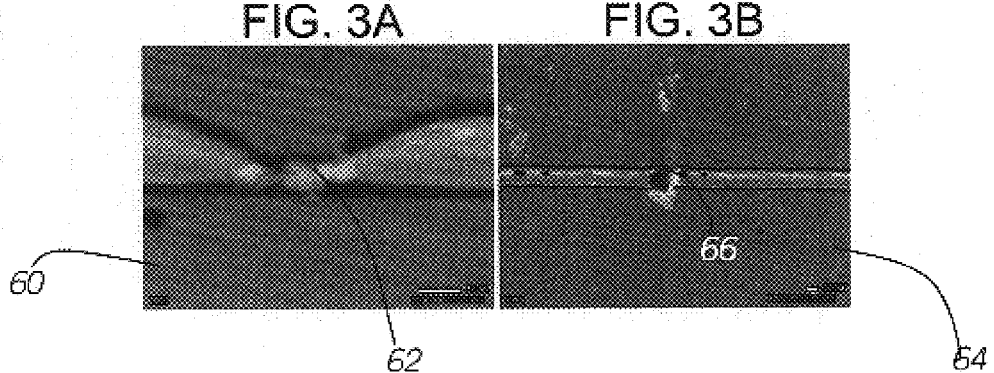

METHOD AND SYSTEM FOR ACTIVELY CONTROLLING AND REDUCING INDUCED ELECTROSTATIC VOLTAGE ON A MAGNETIC STORAGE DISK

RELATED APPLICATION

This application claims the benefit of U.S. Provisional Application Ser. No. 60/526,939 filed Dec. 4, 2003, the contents of which are incorporated herein by reference.

FIELD OF THE METHOD AND SYSTEM

This method and system pertains to magnetic storage systems and methods of operation and, more particularly, to a method and system for actively controlling and reducing induced electrostatic voltage on a magnetic storage disk.

BACKGROUND OF THE METHOD AND SYSTEM

Magnetic storage drives typically use magneto-resistive heads (also know as MR heads, MR sensors and MR elements) to read data from and write data to magnetic storage disks. MR heads exhibit a high sensitivity to damage caused by voltages arising through the process of electrostatic induction (ESI). ESI induces an electric field from one object to create and electric charge or voltage on a second, nearby object. This occurs by virtue of the first object's changing electric field changing the charge distribution on the second object. Frequently, this occurs in the absence of physical contact between the two objects.

An ESI voltage may arise, for example, on a spinning object, such as a magnetic storage disk, even in the absence of any object physically contacting the disk. Due to inherent capacitance between the spinning disk and the MR head, the ESI voltage may cause a breakdown voltage spike to occur between the MR head and the associated disk. Such a voltage spike may damage the MR head and cause hard drive failure.

One method that has been used in older drives to address the ESI voltage problem uses a silver-graphite ground button that contacts the spinning disk shaft. The silver-graphite ground button, by contacting the spinning disk, provides a ground path from the disk to the hard drive base. Unfortunately, this approach adds undesirable friction and vibration to hard drive operation. Hard drive magnetic storage disk rotational rates are presently extending beyond 7200 rpm to 15,000 and higher. At these rotational rates, such friction and vibration become increasingly unacceptable.

Another approach for solving the ESI voltage problem may use the bearing between the disk drive and the disk as conductive path to ground. Ideally, the bearing could provide a discharge path for the ESI voltage. Here, the unfortunate fact of most such bearings, such as the popular fluid dynamic bearing (FDB), air bearing, or needle bearing, demonstrate poor conductive properties. For example, resistance measurements between the spinning magnetic storage disk and base plate with and FDB may be between 1 M$\Omega$ and 400 M$\Omega$. As a result, only a tribocharging current of only $10^{-9}$ A can exist to discharge a generated ESI voltage. Consequently, a 4V or more ESI voltage may arise on the disk. Such a charge can result in breakdown voltage spikes and associated destructive high current and temperature levels arising between the MR head and the disk.

Accordingly, there is a need to avoid or reduce the adverse effects of a generated ESI voltage arising on a rapidly rotating object, such as a magnetic storage disk within a hard drive. Such a method and system, for example, would prevent the damage arising from voltage breakdown between the disk and MR head.

A need exists for a method and system for avoiding or reducing the adverse effects such an ESI voltage on a rapidly rotating object, such a magnetic storage disk, which does not introduce unwanted friction or vibration into the objects operation.

A further need exists for a method and system for avoiding such ESI voltage buildup and the associated MR head and disk damage, which also does not rely on conduction through a high impedance path to ground such as an FDB.

Still further, there is the general need for a solution to the problem of ESI voltage arising on a rapidly spinning disk or other object which also does not increase either the manufacturing or operating costs of the hard drive or other device employing the spinning disk or other object.

SUMMARY OF THE METHOD AND SYSTEM

The present method and system, therefore, provides a method and system for actively controlling and reducing electrostatically induced or ESI voltage on a magnetic storage disk or similar device that avoids or substantially reduces the ESI voltage problems associated with known hard drives and similar systems.

According to one aspect of the method and system, there is provided a method and system for actively measuring and controlling generated ESI voltage on a rapid moving object such as a magnetic storage disk within a hard disk drive. The present method assists in preventing MR head-to-disk damage by measuring the generated ESI voltage on the disk during hard drive operation. The measurement of generated ESI voltage enables producing a responsive signal. During hard drive operation, the responsive signal allows producing an opposing ESI voltage. The method, therefore, further includes applying to a second plate near the disk for inducing the opposing ESI disk voltage. The opposing ESI voltage opposes the generated ESI voltage for preventing breakdown voltages and the associated damaging thermal effects.

The present method and system provide a technical advantage of controlling and reducing disk ESI voltage to an arbitrarily small value for enhancing read and write operations of a hard drive system. Using the present method and system, generated ESI voltages may be essentially eliminated using a system exhibiting low electrical load and manufacturing cost characteristics. In fact, the system of the present invention may use circuit elements which appear in standard integrated circuits performing voltage doubling and feedback functions.

Still another technical advantage of the present method and system includes providing a non-contact voltage probe for sensing a generated ESI voltage rising on a magnetic storage disk. As a result of such sensing, the present method and system produces an opposing ESI voltage using a non-contacting, electrostatic plate. Accordingly no friction or vibration from use of a grounding button or similar component for generated ESI voltage control adversely affects hard drive operation.

Another technical advantage of the present method and system includes avoiding any measurable time delay in managing the generated ESI voltage, as may exist using a poorly conducting FDB or other bearing. The time for the generated ESI voltage to arise during hard drive operation extends well beyond the response time of the present method and system for sensing the generated ESI voltage and producing the opposing ESI voltage.

Another technical advantage of the present method and system includes requiring only a very small amount of current to produce the opposing ESI voltage. Moreover, producing the opposing ESI voltage requires integrated circuit components that do not produce significant current or associated heat in their operation. The present method and system, therefore, may be readily incorporated into existing designs for hard drives and similar devices requiring generated ESI voltage control and elimination.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present method and system for actively measuring and controlling generated ESI voltage on a magnetic storage disk or similar device, reference is now made to the following description which is to be taken in conjunction with the accompanying drawings and in which like reference numbers indicate like features and further wherein:

FIG. 1 illustrates a diagrammatic side view of a magnetic storage drive system for employing the present ESI control method and system;

FIG. 2 is a diagrammatic side view of an MR head assembly depicting the physical association with a typical magnetic storage disk;

FIGS. 3A and 3B illustrate differing types of damage occurring on the MR head and disk, respectively, arising from induced electrostatic voltage breakdown;

DETAILED DESCRIPTION OF THE ILLUSTRATIVE EMBODIMENTS

Figure 4:
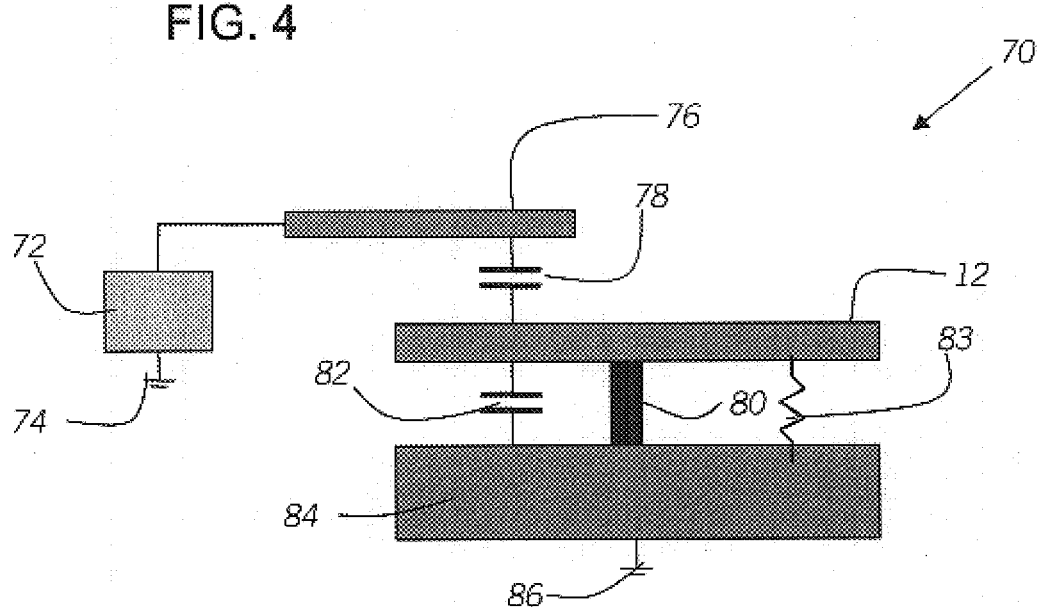
FIG. 4 depicts a voltage divider circuit existing between the MR head and a magnetic storage disk to which one embodiment of the present invention applies.

Preferred embodiments of this method and system are described herein, including the best mode known to the inventor for carrying out the method and system. Variations of those preferred embodiments may become apparent to those of ordinary skill in the art upon reading the following description.

FIG. 1 provides a brief, general description of a suitable environment in which the method and system may be implemented. Referring to FIG. 1, hard drive 10 includes a plurality of magnetic storage disks 12, 14 and 16, each of which is configured to rotate about an axis 18. Hard drive 10 further includes MR head stack assembly 20 having a plurality of MR head support assemblies 22, 24, 26, 28, 30 and 32, each of which is coupled by a gimbals mechanism to a respective slider 34, 36, 38, 40, 42 and 44. Each slider 34–44 supports one or more magnetic read/write transducers (MR heads) that may read data from and write data to magnetic storage disks 12–16. Each magnetic storage disk 12–16 stores information in magnetic recording media supported on each disk; the information is stored in an annular pattern of concentric data tracks. As a disk rotates, data stored at different locations on the disk may be accessed by moving a slider to the appropriate locations on the surface of the disk.

Actuator assembly 46 controls slider 34–44 movement, thereby controlling the positions of MR head support assemblies 22–32. Head support assemblies 22–32 bias sliders 34–44 against the surfaces of disks 12–16. The rotation of disks 12–16 produces air bearings, between sliders 34–44 and the surfaces of disks 12–16 for lifting sliders 34–44 above the surfaces of disks 12–16 by a small, substantially constant distance.

FIG. 2 shows slider 34, which includes MR head 50. MR head 50 includes read/write sensors 52 and between shields 54. Carbon overcoat 56 covers the underside of slider 34. Likewise, carbon overcoat 58 covers magnetic storage disk 12. Because the capacitive nature of carbon overcoats 56 and 58, the slider 34 and MR head 50 configuration of FIG. 2 establishes a capacitive voltage divider circuit. The present method and system actively controls the generated ESI voltage on disk 12 by first sensing the generated ESI voltage and then directing an opposing ESI voltage toward magnetic storage disk 12. The opposing ESI voltage results in a zero voltage difference between magnetic storage disk 12 and MR head 50.

FIGS. 3A and 3B illustrate differing types of damage occurring on MR head 50 and magnetic storage disk 12, respectively. Such damage arises from breakdown voltage spikes when the generated ESI voltage on magnetic storage disk 12 reaches a level causing the capacitive voltage divider circuit described in FIGS. 2 and 4 to breakdown. If a breakdown voltage spike occurs, then magnetic storage disk 12 and read/write sensors 52 may experience thermal damage due to an associated high current transient. In FIG. 3A, shows a crater 62 formed on MR head 50 at a point of a breakdown voltage between MR head 50 and a magnetic storage disk 12. FIG. 3B shows a similar damage pit 66 arising on disk 12 from breakdown due to a high current density between MR head 50 and magnetic storage disk 12. Read/write sensor defect 62 prevents the hard drive from reading and writing data, and pit 66 could lead to data loss from magnetic storage disk 12. In addition, due to particles coming from such damage sites, further damage may arise from interference between MR head 50 and magnetic storage disk 12. That is, conductive particles or asperities may also temporarily short and, consequently, cause further damage to read/write sensor 52 and magnetic storage disk 12.

FIG. 4 depicts how an electrostatic plate introduced proximate to magnetic storage disk 12 may form voltage divider circuit 70. Voltage divider circuit 70 supplies an opposing ESI voltage to magnetic storage disk 12 and includes voltage supply 72 connecting to ground 74. Voltage supply 72 provides voltage, Vplate, to plate 76. Cplate capacitance 78 separates plate 76 from magnetic storage disk 12. Spindle 80 supports magnetic storage disk 12 and, through a Fluid Dynamic Bearing (FDB) or other bearing assembly, includes Cdisk capacitance 82 and Rdisk resistance 83. Cdisk 82 and Rdisk 83 connect to base 84, which further connects to ground 86, thereby establishing on magnetic storage disk 12 the voltage, Vdisk.

The value for $V_{disk}$ may be calculated using the following formula:

$$V_{disk} = V_{plate}\left(\frac{C_{plate}}{C_{disk} + C_{plate}}\right) \qquad \text{Eq. 1}$$

Where $C_{plate}$ and $C_{disk}$ are the plate-to-disk and disk-to-ground capacitances respectively. Using Equation 1, if $V_{plate}$ is 1V, $C_{plate}$=15 pF, $C_{disk}$=35 pF, then $V_{disk}$=0.3V.

With reference to FIG. 4, note that in the event of an infinite $R_{disk}$ (e.g., as would exist with an air bearing or with a perfectly insulating bearing), the $R_{disk}C_{disk}$ time constant is likewise infinite and no discharge path to ground 86 exists. Likewise, with a significantly large $R_{disk}$, the $R_{disk}C_{disk}$ time constant assumes a correspondingly large value, which, as previously mentioned, affects the ability to discharge from magnetic storage disk 12 a generated ESI voltage. As will be shown further in FIGS. 8 through 11, below, the $R_{disk}C_{disk}$ time constant magnitude generally assumes a sufficiently significant value to require the present method and system for effective generated ESI voltage control. Understanding voltage divider circuit 70, moreover, assists in appreciating general aspects of the present invention.

Figure 5:
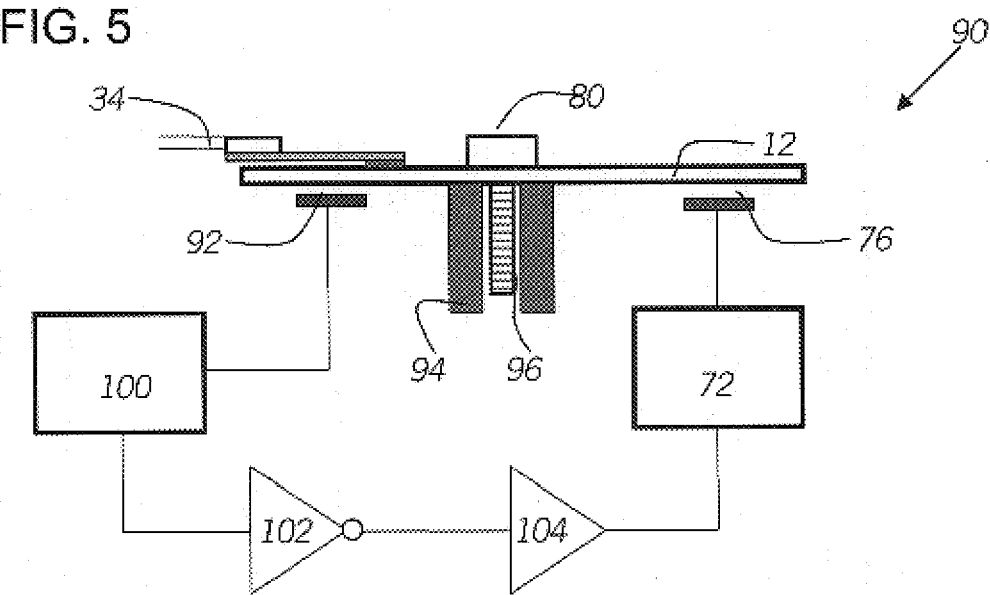
FIG. 5 shows one embodiment of the present method and system for controlling a generated ESI voltage on a magnetic storage disk.

FIG. 5 shows one embodiment of the present method and system for controlling the ESI voltage between an MR head and a magnetic storage disk. In FIG. 5, ESI circuit 90 includes plate 92 which connects to charge amplifier 100 for measuring Vdisk. Bearing 94 surrounds spindle motor shaft 96 which connects to spindle 80. Metal plate (P1) 92 is positioned at a distance sufficiently close to sense a generated ESI field on magnetic storage disk 12. Charge amplifier 100 receives the generated ESI voltage signal sensed by P1 92 for producing an analog output to inverter 102. Inverter 102 inverts and scale circuit 104 scales the analog signal for input to voltage source 72. Voltage source 72 supplies a voltage to plate (P2) 76. Then, P2 76 supplies an ESI voltage sufficiently proximate to magnetic storage disk 12 to induce an opposing ESI voltage on magnetic storage disk 12. The opposing ESI voltage from P2 76 cancels or mitigates the generated ESI voltage on magnetic storage disk 12. In this configuration, ESI circuit 90, therefore, presents a feedback loop responsive to the generated ESI voltage on magnetic storage disk 12. The feedback mechanism of ESI circuit 90 actively controls the ESI voltage on magnetic storage disk 12 to a zero or minimum level for preventing a breakdown voltage spike between disk 12 and MR head 50.

In many hard drive devices, there may already exist metal objects or plates capable of serving as P1 92 and P2 76. For example, in a number of existing hard drive designs, plates exist for controlling turbulent airflow proximate to magnetic storage disk 12. Such turbulent airflow plates are sufficiently proximate to magnetic storage disk 12 for sensing a generated ESI voltage and producing an opposing ESI voltage. Similarly, the particular type of conductive material or metal may be suitable for P1 92 and P2 76 may vary widely. Essentially any configuration and/or material making possible actively sensing and controlling a generated ESI voltage on a magnetic storage disk 12 or similarly rotating spinning object in a similar device may be considered as well within the scope of the present method and system.

There may also be a number of different feedback circuits or other mechanisms, such as filters for generating the opposing ESI voltage for plate P2 76 in response to the generated ESI voltage sensed by plate P1 92. For example, an integrated circuit including a processor performing a rapidly operating proportional integral differential or PID algorithm may provide the desired control to the source plate voltage that would counteract the voltage that arises on magnetic storage disk 12. Such a circuit or similar circuits are well within the scope of the present method and system.

Figure 6:
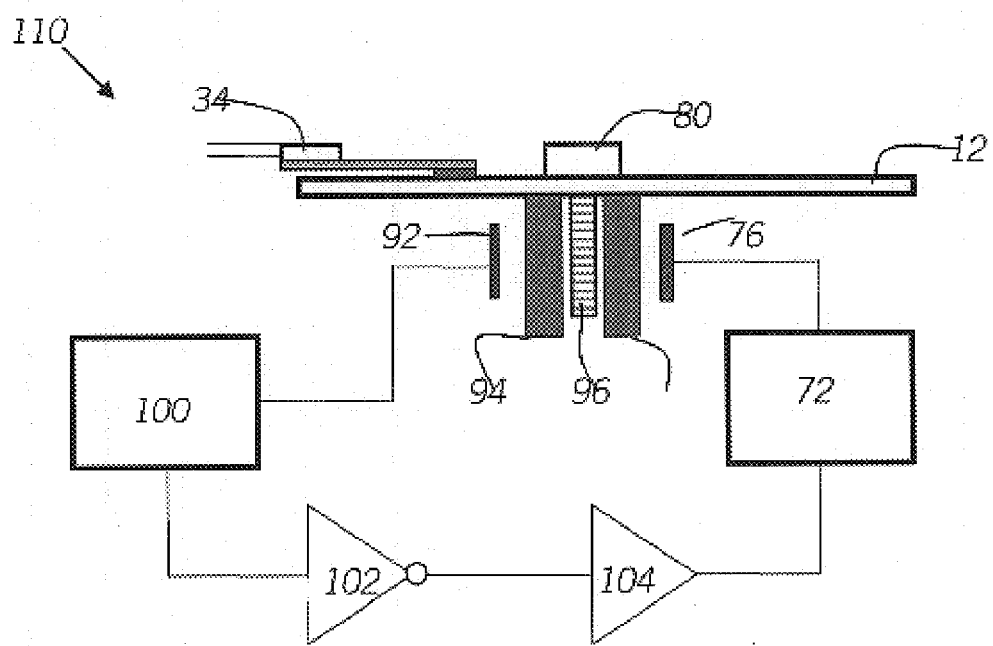
FIG. 6 presents an alternative embodiment of the present method and system for controlling a generated ESI voltage on a magnetic storage disk.

FIG. 6, therefore, presents an alternative embodiment of the present method and system for controlling the generated ESI voltage on a magnetic storage disk 12. In the FIG. 6, ESI circuit 110 includes P1 92 which senses the generated ESI voltage at bearing 94 instead of the underside of magnetic storage disk 12. The P1 92 sends the sensed signal to charge amplifier 100, which provides an output to inverter 102. Inverter 102 inverts the signal from charge amplifier 100 and directs the inverted signal to scale amplifier 104. Scale amplifier 104 provides a scaled and inverted signal to voltage source 72, which in turn generates an ESI voltage to P2 76.

Regardless of the particular configuration or embodiment for performing the novel functions of the present method and system, it is clear that a voltage on P2 76 applied by ESI control circuit 90 or 110, for example, experiences the voltage divider circuit characteristics of FIG. 4.

Figure 7:
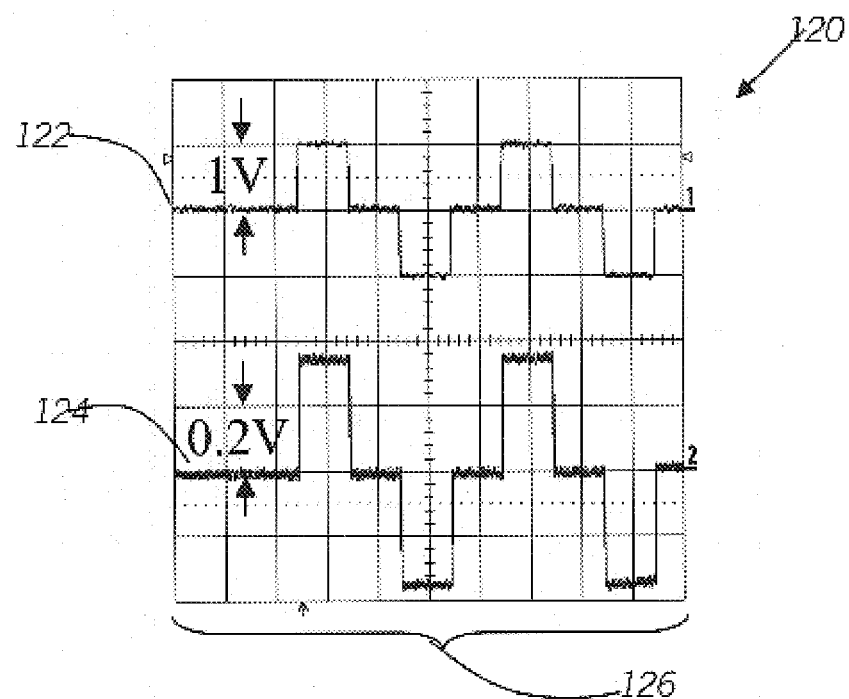
FIG. 7 shows a plot over time of a voltage applied to an electrostatic plate such as employed in one embodiment of the present method and system and an opposing ESI voltage on a magnetic storage disk.

Therefore, FIG. 7 shows a recorded plot of applied plate voltage, Vplate, and the corresponding ESI voltage, Vdisk, induced voltage on a magnetic storage disk 12 over time. In chart 120, P2 76 waveform 122 oscillates between +/–1V, while the measured ESI voltage waveform 124 oscillates correspondingly between +/–0.3V to illustrate the ESI performance. Successful ESI voltage production on magnetic storage disk 12 from P2 76 occurs, therefore, without physically contacting magnetic storage disk 12. In the example of FIG. 7, the impedances corresponded to the example of Equation 1 in FIG. 4. Consequently, the induced ESI voltage varying +/–0.3V is consistent with the FIG. 4 voltage divider circuit 70.

Figure 10:
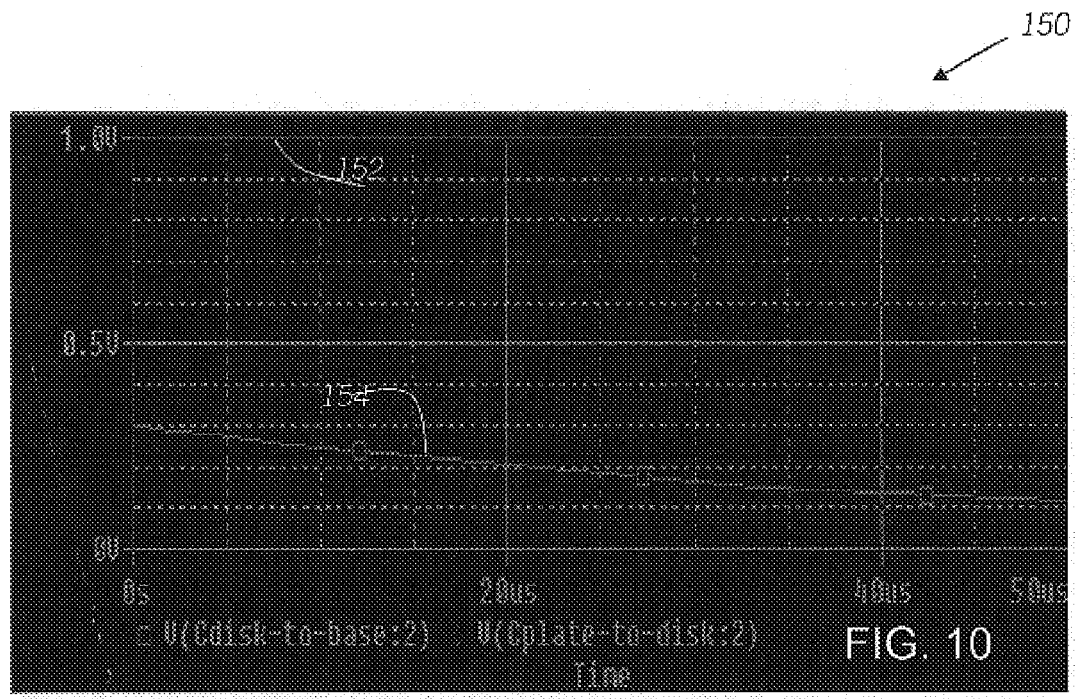
FIGS. 8 through 11 show voltages on an electrostatic plate vs. resulting ESI voltages on a magnetic storage disk for demonstrating the effectiveness of one embodiment of the present method and system in the presence of a finite resistance between the magnetic storage disk and ground.
Figure 11:
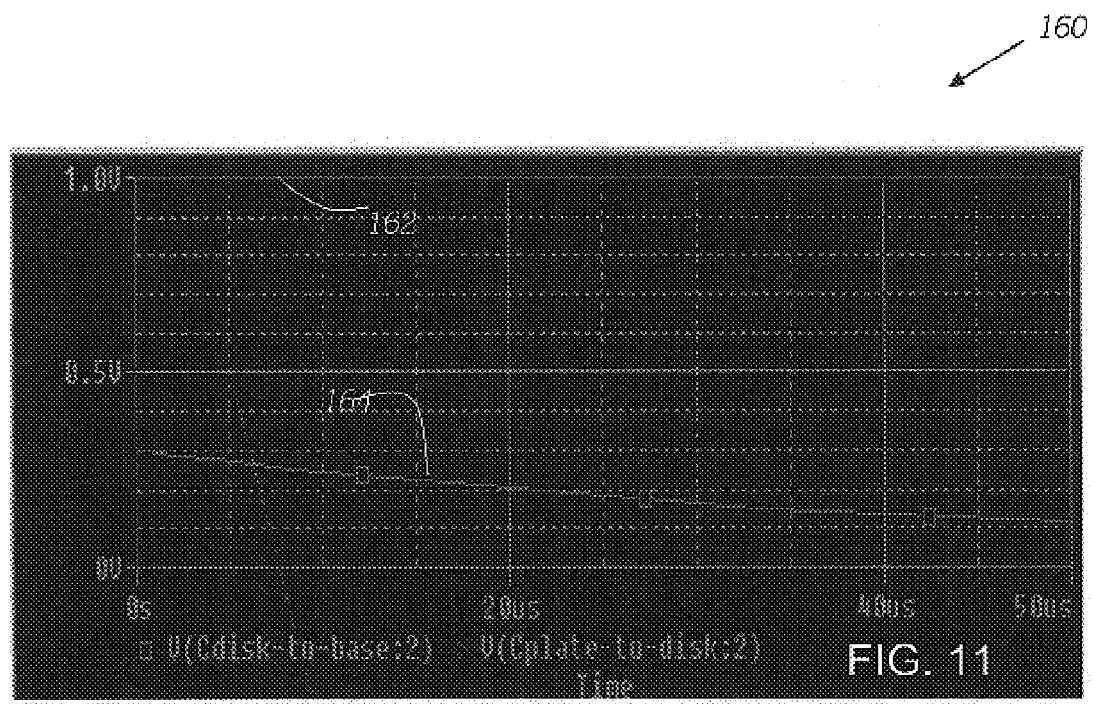
Figure 8:
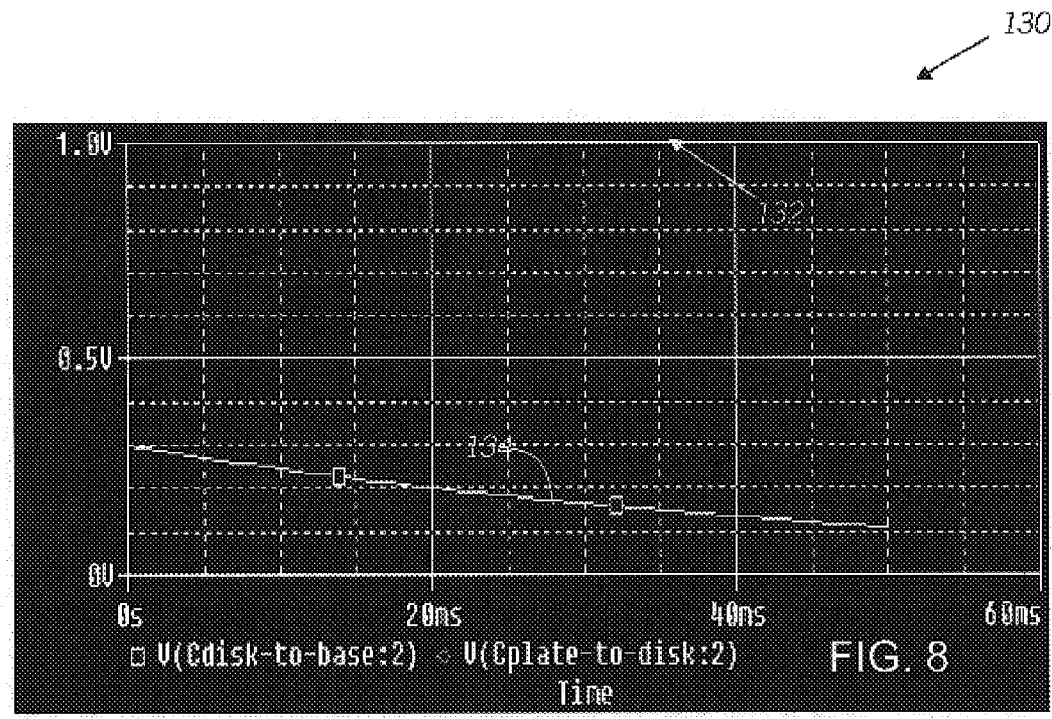
Figure 9:
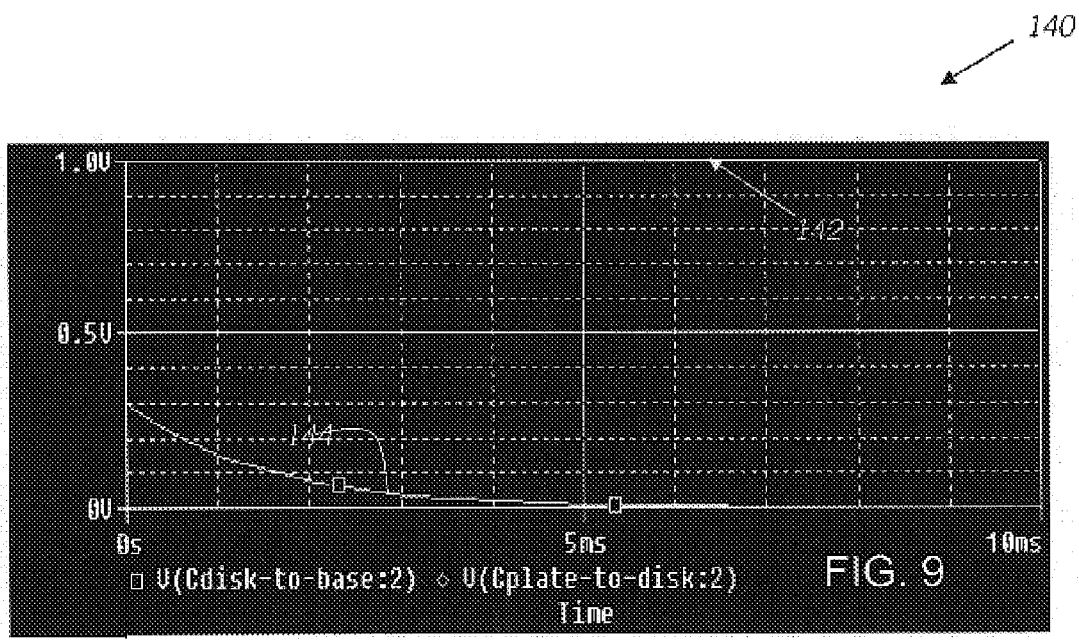

FIGS. 8 through 11 take into consideration the possibility of a non-infinite $R_{disk}$ as discussed in connection with FIG. 4. FIG. 8, therefore, shows plot 130 tracking voltage against a time scale of 0 to 60 ms, reports the effect of applying 1 V, line 132, to plate P2 76 in an ESI control circuit wherein the disk resistance equals 1 GΩ. This configuration generates initially a 0.3V opposing ESI voltage, $V_{disk}$ line 134, on disk 12 decays with an RC time constant RC of 1 GΩ×35 pF=35 ms. FIG. 9 shows plot 140 tracking voltage against a time scale of 0 to 10 ms, reports the effect of applying 1 V, line 142, to plate P2 76 where disk resistance equals 30MΩ. Here the 0.3V opposing ESI voltage, $V_{disk}$ line 144, on disk 12 decays with an RC time constant RC of 30 MΩ×35 pF=1.05 ms. FIG. 10 shows plot 150 tracking voltage against a time scale of 0 to 50 μs, reports the effect of applying 1 V, line 152, to plate P2 76 where disk resistance equals 1 MΩ. Here the 0.3V opposing ESI voltage, $V_{disk}$ line 154, on disk 12 decays with an RC time constant RC of 1 MΩ×35 pF=35 μs. Finally, FIG. 11 shows plot 160 tracking plots voltage against a time scale of 0 to 6 μs, reports the effect of applying 1 V, line 162, to plate P2 76 where disk resistance equals 100 kΩ. Here the 0.3V opposing ESI voltage, $V_{disk}$ line 164, on disk 12 decays with an RC time constant RC of 100 kΩ×35 pF=3.5 μs.

When $R_{disk}$ is finite, magnetic storage disk 12 possesses a generated ESI voltage excursion lasting for ·τ, where $t=R_{disk} \times C_{disk}$. Thus, the generated ESI voltage is not controlled on magnetic storage disk 12 for this time period and breakdown can result. An ESI control circuit, such as ESI control circuit 90 of FIG. 5, during this period, can control and reduce the magnetic storage disk 12 ESI voltage level to prevent breakdown voltages from occurring. Generated ESI voltage, however, is not needed for times >3τ, because the finite $R_{disk}$ has discharged the voltage.

Those skilled in the art will appreciate that the present method and system may be embodied in other specific forms without departing from its spirit or essential characteristics. The described embodiments are to be considered in all respects only as illustrative and not restrictive. For example, although the method and system has been described in the context of a magnetic disk storage system, the method and system also is applicable to other magnetic recording systems and, in general, to systems that include any device capable generating an ESI voltage. The scope of the method and system is, therefore, indicated by the appended claims rather than by the foregoing description. All changes which come within the meaning and range of equivalency of the claims are to be embraced within their scope.

What is claimed is:

1. A method for actively controlling electrostatic induction (ESI) voltage on an object, comprising the steps of:
   monitoring a generated ESI voltage on the object;
   generating a signal responsive to said generated ESI voltage;
   producing an opposing ESI voltage in response to said responsive signal; and
   applying said opposing ESI voltage to said object for opposing and controlling said generated ESI voltage.

2. The method of claim 1, wherein said monitoring further comprises monitoring the generated ESI voltage using a non-contact ESI voltage sensing circuit.

3. The method of claim 2 wherein the non-contact electrostatic voltage sensing circuit comprises an electrically conductive object in proximity to a source of the generated ESI voltage that induces coupling through an electric field.

4. The method of claim 1, wherein said producing an opposing voltage step further comprises inducing an electrostatic voltage using a non-contact electrostatic voltage inducing circuit.

5. The method of claim 1, wherein said object comprises a magnetic hard disk and further wherein said producing an opposing voltage step further comprises actively inducing a hard disk electrostatic voltage using a non-contact electrostatic voltage inducing circuit.

6. The method of claim 5 wherein the non-contact electrostatic voltage inducing circuit comprises an electrically conductive object in proximity to a source of electrostatic voltage that induces coupling through an electric field.

7. The method of claim 1, wherein said object comprises a rotating storage medium and said monitoring further comprises actively monitoring the rotating storage medium using a non-contact electrostatic voltage sensing circuit to detect inherent capacitance between the rotating storage medium and a second object.

8. The method of claim 7 wherein the non-contact electrostatic voltage sensing circuit comprises an electrically conductive object in proximity to a source of the generated ESI voltage that induces coupling through an electric field.

9. The method of claim 7 wherein the non-contact electrostatic voltage sensing circuit comprises an electrically conductive object in proximity to a source of electrostatic voltage that induces coupling through an electric field.

10. The method of claim 7 wherein the non-contact electrostatic voltage sensing circuit is proximate to a spindle of a magnetic storage medium.

11. The method of claim 7 wherein the non-contact electrostatic voltage sensing circuit is proximate to a magnetic storage media.

12. The method of claim 7 wherein the non-contact electrostatic voltage sensing circuit is integral to a bearing assembly.

13. The method of claim 1 wherein the producing an opposing voltage comprises filtering the signal responsive to the generated ESI voltage.

14. The method of claim 13 wherein said filtering includes applying a transfer function with a negative gain at zero frequency.

15. The method of claim 13 wherein said filtering generates a negative feedback loop.

16. The method of claim 13 wherein said filtering includes applying a filter with one or more of a derivative, an integral and/or a proportional operator.

17. A system for actively controlling electrostatic induction (ESI) voltage on an object, the system comprising:
   a non-contact ESI voltage sensing circuit configured to monitor a generated ESI voltage on the object;
   a signal generator configured to be responsive to said generated ESI voltage and generate a signal; and
   a circuit configured to produce an opposing ESI voltage in response to said signal and apply said opposing ESI voltage to said object to oppose and control said generated ESI voltage.

18. The system of claim 17 wherein said circuit is configured to produce an opposing ESI voltage in response to said signal and apply said opposing ESI voltage to actively induce electrostatic voltage on the object.

19. The system of claim 17 wherein said storage medium comprises a rotating storage medium and said non-contact ESI voltage sensing circuit is configured to monitor the generated ESI voltage on the object is configured to actively monitor the rotating storage medium ESI voltage.

20. The system of claim 17 further comprising a filter configured to produce the opposing voltage, the filter responsive to the generated ESI voltage.

21. The system of claim 20 wherein said filter is configured to respond to the generated ESI voltage, the generated ESI voltage monitored using at least an electrostatic plate introduced proximate to a magnetic storage disk.

22. The system of claim 20 wherein said filter is configured to apply a transfer function with a negative gain at zero frequency.

23. The system of claim 20 wherein said filter includes one or more of a derivative, integral and proportional operator.

24. The system of claim 17 wherein said non-contact electrostatic voltage sensing circuit comprises an electrically conductive object in proximity to a source of electrostatic voltage that induces coupling through an electric field.

25. The system of claim 17 wherein said non-contact electrostatic voltage sensing circuit is proximate to a spindle of a magnetic hard disk.

26. The system of claim 17 wherein said non-contact electrostatic voltage sensing circuit is proximate to a magnetic storage media.

27. The system of claim 17 wherein said non-contact electrostatic voltage sensing circuit is integral to a bearing assembly.

28. The system of claim 17 wherein the generated ESI voltage is actively controlled by the opposing ESI voltage, the opposing ESI voltage directed toward a magnetic storage disk to result in a zero voltage difference between the magnetic storage disk and magnetic read/write transducers.

29. The system of claim 17 wherein the ESI voltage sensing circuit senses the generated ESI voltage at a bearing independent of an underside of a magnetic storage disk.

30. The system of claim 29 further comprising:

a charge amplifier coupled to receive a sensed signal from the ESI voltage sensing circuit;

an inverter coupled to receive the sensed signal and invert the sensed signal;

a scale amplifier coupled to receive the inverted signal; and a voltage source coupled to receive the scaled and inverted signal and generate an ESI voltage.

* * * * *